United States Patent
Kim et al.

(10) Patent No.: US 10,715,998 B2
(45) Date of Patent: Jul. 14, 2020

(54) METHOD AND APPARATUS FOR SIMULTANEOUSLY PROVIDING MOBILITY MANAGEMENT AND PRIVACY PROTECTION

(71) Applicant: Korea Advanced Institute of Science and Technology, Daejeon (KR)

(72) Inventors: Myung Chul Kim, Daejeon (KR); Jae Hyun Park, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 16/565,704

(22) Filed: Sep. 10, 2019

(65) Prior Publication Data

US 2020/0092717 A1    Mar. 19, 2020

(30) Foreign Application Priority Data

Sep. 13, 2018  (KR) .......................... 10-2018-0109634

(51) Int. Cl.
| | |
|---|---|
| *H04W 12/02* | (2009.01) |
| *H04W 8/08* | (2009.01) |
| *H04L 29/06* | (2006.01) |
| *H04W 12/00* | (2009.01) |
| *H04W 64/00* | (2009.01) |
| *H04L 9/06* | (2006.01) |

(52) U.S. Cl.
CPC .............. *H04W 12/02* (2013.01); *H04L 69/22* (2013.01); *H04W 8/08* (2013.01); *H04W 12/001* (2019.01); *H04W 64/00* (2013.01); *H04L 9/0625* (2013.01); *H04L 9/0631* (2013.01); *H04L 2209/80* (2013.01)

(58) Field of Classification Search
CPC ....... H04W 12/02; H04W 8/08; H04W 64/00; H04W 12/001; H04L 69/22; H04L 9/0625; H04L 2209/80; H04L 9/0631
See application file for complete search history.

(56) References Cited

U.S. PATENT DOCUMENTS

| | | |
|---|---|---|
| 2010/0208742 A1 | 8/2010 | Kafle et al. |
| 2015/0016459 A1 | 1/2015 | Lee et al. |
| 2015/0040238 A1 | 2/2015 | Sarsa Sarsa |
| | (Continued) | |

FOREIGN PATENT DOCUMENTS

| | | |
|---|---|---|
| KR | 20100073842 A | 7/2010 |
| KR | 20130087932 A | 8/2013 |
| | (Continued) | |

OTHER PUBLICATIONS

Office Action issued in Korean Patent Application No. 10-2018-0109634; dated Jul. 31, 2019; 8 pages, including partial machine translation.

(Continued)

*Primary Examiner* — Nizar N Sivji
(74) *Attorney, Agent, or Firm* — Ulmer & Berne LLP

(57) ABSTRACT

Provided is a method and apparatus for simultaneously providing mobility management and privacy protection. A communication method includes receiving a packet for a terminal and processing at least one of a locator included in the packet and location information of the terminal based on a mobility of the terminal.

19 Claims, 9 Drawing Sheets

(56) References Cited

U.S. PATENT DOCUMENTS

| | | | | |
|---|---|---|---|---|
| 2017/0188223 | A1* | 6/2017 | Gundavelli | H04W 8/04 |
| 2019/0037390 | A1* | 1/2019 | Hooda | H04W 8/26 |

FOREIGN PATENT DOCUMENTS

| | | |
|---|---|---|
| KR | 20130116441 A | 10/2013 |
| KR | 20170097457 A | 8/2017 |
| KR | 20180047961 A | 5/2018 |
| KR | 20180060908 A | 6/2018 |
| WO | 2010074512 A2 | 7/2010 |

OTHER PUBLICATIONS

Moskowitz, R. et al.; Host Identity Protocol; Network Working Group, Request for Comments; Apr. 2008; 104 pages.

Andersen, David G. et al.; Accountable Internet Protocol (AIP); SIGCOMM '08, Aug. 17-22, 2008; Seattle, WA; 12 pages.

Farinacci, D. et al.; The Locator/ID Separation Protocol (LISP); Internet Engineering Task Force, Request for Comments; Jan. 2013; 75 pages.

Kim, Changhoon et al.; Floodless in SEATTLE: A Scalable Ethernet Architeture for Large Enterprises; SIGCOMM 08, Aug. 17-22; Seattle, WA; pp. 3-14.

Han, Sangyup et al.; Abstract of article, "Mobility of Everything (MoE): An Integrated and Distributed Mobility Management"; 2017 26th International Conference on Computer Communication and Networks (ICCCN), Jul. 31-Aug. 3, 2017; 1 page.

Lee, Taeho et al.; Source Accountability with Domain-brokered Privacy; Oct. 3, 2016; 17 pages.

Lee, Taeho et al.; Communication Based on Per-Packet One-Time Addresses; published in 2016 IEEE 24th International Conference on Network Protocols (ICNP), Nov. 8-11, 2016; 12 pages, including publication information.

Raghavan, Barath et al.; Enlisting ISPs to Improve Online Privacy: IP Address Mixing by Default; PETS 2009, LNCS 5672; pp. 143-163; Springer-Verlag Berlin Heidelberg 2009.

Hsiao, Hsu-Chun et al.; LAP: Lightweight Anonymity and Privacy; 2012 IEEE Symposium on Security and Privacy, May 20-23, 2012; pp. 506-520, plus 1 page publication information.

Han, Seungyeop et al.; Expressive Privacy Control with Pseudonyms; SIGCOMM '13, Aug. 12-16, 2013; pp. 291-302.

Dingledine, Roger et al.; Tor: The Second-Generation Onion Router; Proceedings of the 13th USENIX Security Symposium, Aug. 9-13, 2004; 19 pages.

Venkataramani, Arun, et al.: MobilityFirst: A Mobility-Centric and Trustworthy Internet Architecture; ACM SIGCOMM Computer Communication Review; vol. 44 Issue 3, Jul. 2014; 9 pages, including publication information.

* cited by examiner

100

200

130

METHOD AND APPARATUS FOR SIMULTANEOUSLY PROVIDING MOBILITY MANAGEMENT AND PRIVACY PROTECTION

CROSS-REFERENCE TO RELATED APPLICATION(S)

This application claims the priority benefit of Korean Patent Application No. 10-2018-0109634 filed on Sep. 13, 2018 in the Korean Intellectual Property Office, the disclosures of which are incorporated herein by reference for all purposes.

BACKGROUND

1. Field

One or more example embodiments relate to a method and apparatus for simultaneously providing a mobility management and a protection privacy.

2. Description of Related Art

Currently, types of things and a number of things used through connection to the Internet are increasing rapidly. One overseas media estimated that 50 billion things would be connected to the Internet by 2020. Also, another media forecast that 200 million and 5 thousand vehicles would be connected to the Internet by 2020. In addition, a number of devices connected to the Internet would increase exponentially with a great increase in a number of various mobile devices, for example, Internet of things (IoT) devices, vehicles, drones, and wearable devices, in addition to existing mobile phones and laptop computers.

To support a mobility of a device connected to the Internet, an Internet engineering task force (IETF) has standardized mobile Internet protocol version (IPv4), mobile IPv6, and proxy mobile IPv6. Also, an evolved packet core (EPC) of $4^{th}$ generation (4G) network uses proxy mobile IPv6 and general packet radio service (GPRS) tunneling protocol to support the mobility. All of mobile IPv4, mobile IPv6, proxy mobile IPv6, and GPRS tunneling protocol include a centralized mobility anchor. A centralized approach method is in a simple structure in which a mobility anchor establishes a tunnel with an access router connected to a terminal and transfers a packet to the access router. However, the centralized approach method has a poor expandability and inefficient routing due to a central server structure.

To outperform routing table explosion of the Internet and to provide multi-homing and mobility, methods capable of replacing an Internet protocol (IP) address are being developed. An identifier-locator separation method for replacing an IP address and separating the IP address into an identifier and a locator simultaneously includes a fixed identifier of a terminal and a network location of the terminal in a packet. The packet is transferred through a system having a locator, for example, an autonomous system (AS), a router, and a terminal. Accordingly, although the locator is changed, communication is performed using the same identifier.

SUMMARY

Example embodiments provide simultaneously provide two techniques without causing an interoperability issue in simultaneously providing mobility management of a terminal and a privacy protection by processing one of a locator included in a packet and location information of the terminal based on a mobility of the terminal.

According to an aspect, there is provided a communication method including receiving a packet for a terminal; and processing at least one of a locator included in the packet and location information of the terminal based on a mobility of the terminal.

The processing may include determining a type of the packet; processing the location information of the terminal by detecting a movement of the terminal when the packet is associated with the movement of the terminal; and processing the locator included in the packet when the packet is unassociated with the movement of the terminal.

The processing of the location information of the terminal may include detecting a connection of the terminal; and registering a location of the terminal in response to the connection of the terminal or updating the location of the terminal in response to a change in the location of the terminal based on the connection of the terminal.

The detecting may include detecting the connection of the terminal by inspecting a dynamic host configuration protocol (DHCP) packet or an address resolution protocol (ARP) packet transmitted from the terminal.

The processing of the locator may include determining whether the packet is transmitted from a router of an autonomous system (AS) that includes a communication apparatus; processing the locator using at least one of a hidden locator and a locator of a router connected to the terminal, when the packet is determined to not be transmitted from the router of the AS that includes the communication apparatus; and processing the locator using at least one of a locator of the AS that includes the communication apparatus and an identifier of the terminal, when the packet is transmitted to be transmitted from the router of the AS that includes the communication apparatus.

The processing of the locator using at least one of the hidden locator and the locator of the router connected to the terminal may include determining whether a source locator of the packet is a locator included in the AS and determining whether to process the source locator of the packet using the hidden locator; and determining whether a destination locator of the packet is the locator of the AS and determining whether to process the destination locator of the packet using the locator of the router connected to the terminal.

The determining whether to process the source locator of the packet may include generating the hidden locator when the source locator of the packet is the locator included in the AS; and setting the generated hidden locator as the source locator of the packet.

The communication method may further include generating an anonymized identifier of the terminal by encrypting the identifier of the terminal; and transmitting the generated anonymized identifier to the terminal or setting the generated anonymized identifier as a source identifier of the packet.

The encrypting may use an advanced encryption standard (AES) or a data encryption standard (DES).

The determining whether to process the destination locator of the packet may include acquiring an identifier of the terminal by decrypting an anonymized identifier included in a destination identifier of the packet when the destination locator of the packet is the locator of the AS; acquiring the locator of the router connected to the terminal using the acquired identifier of the terminal; and setting the acquired locator of the router as the destination locator of the packet.

The processing the locator using at least one of the identifier of the terminal and the locator of the AS that includes the communication apparatus may include determining whether a source locator of the packet is a locator included in the AS or the hidden locator and determining whether to process the source locator of the packet using the locator of the AS; and determining whether a destination locator of the packet is the locator included in the AS and determining whether to process the destination locator of the packet using the locator of the router connected to the terminal.

The determining whether to process the source locator of the packet may include generating the locator of the AS when the source locator of the packet is the locator included in the AS or the hidden locator; and setting the generated locator of the AS as the source locator of the packet.

The determining whether to process the destination locator of the packet may include acquiring an identifier of the terminal by descripting an anonymized identifier included in a destination identifier of the packet when the destination locator of the packet is the locator included in the AS; and setting the acquired identifier of the terminal as the destination locator of the packet.

According to an aspect, there is provided a communication apparatus including a transceiver configured to receive a packet for a terminal; and a controller configured to process at least one of a locator included in the packet and location information of the terminal based on a mobility of the terminal.

The controller may include a packet processor configured to determine a type of the packet, to transmit the packet to a mobility manager when the packet is associated with a movement of the terminal and to process the locator included in the packet when the packet is unassociated with the movement of the terminal; and the mobility manager configured to detect the movement of the terminal using the packet and to process the location information of the terminal.

The mobility manager may include a terminal connection detector configured to detect a connection of the terminal using the packet; a terminal location register configured to register a location of the terminal in response to the connection of the terminal; and a terminal location updater configured to update the location of the terminal in response to a change in the location of the terminal based on the connection of the terminal.

The mobility manager may include a terminal location inquirer configured to acquire router information connected to the terminal using an identifier of the terminal, based on the location of the terminal registered to the terminal location register.

The terminal connection detector may be configured to detect the connection of the terminal by inspecting a dynamic host configuration protocol (DHCP) packet or an address resolution protocol (ARP) packet transmitted from the terminal.

The packet processor may include a packet type inspector configured to determine the type of the packet, to transmit the packet to the mobility manager when the packet is associated with the movement of the terminal and to transmit the packet to a first packet processor or a second packet processor depending on whether the packet is transmitted from a router of an autonomous system (AS) that includes the communication apparatus, when the packet is unassociated with the movement of the terminal; the first packet processor configured to process the locator included in the packet using at least one of a hidden locator and a locator of a router connected to the terminal; and the second packet processor configured to process the locator included in the packet using at least one of a locator of the AS that includes the communication apparatus and an identifier of the terminal.

The first packet processor may include a first determiner configured to determine at least one of whether a source locator of the packet is a locator included in the AS and whether a destination locator of the packet is a locator of the AS, and to transmit at least one of a hidden locator generation signal and the packet depending on the determining; a locator hider configured to receive the hidden locator generation signal and to generate the hidden locator; a first decoder configured to acquire an identifier of the terminal by decrypting an anonymized identifier included in a destination identifier of the packet; a locator resolver configured to acquire the locator of the router connected to the terminal using the identifier of the terminal; and a first setter configured to set one of the hidden locator and the locator of the router as the source locator of the packet.

The first packet processor may further include an anonymized identifier allocator configured to generate the anonymized identifier of the terminal by encrypting the identifier of the terminal and to transmit the generated anonymized identifier to the terminal or to set the generated anonymized identifier as the source locator of the packet.

The encryption may use an advanced encryption standard (AES) or a data encryption standard (DES).

The second packet processor may include a second determiner configured to determine at least one of whether a source locator of the packet is the locator included in the AS or a hidden locator and whether a destination locator of the packet is the locator included in the AS and to transmit at least one of an AS locator generation signal and the packet depending on the determining; a locator generator configured to receive the AS locator generation signal and to generate the locator of the AS; a second decoder configured to acquire an identifier of the terminal by decrypting an anonymized identifier included in a destination identifier of the packet; and a second setter configured to set the locator of the AS or the identifier of the terminal as the destination locator of the packet.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
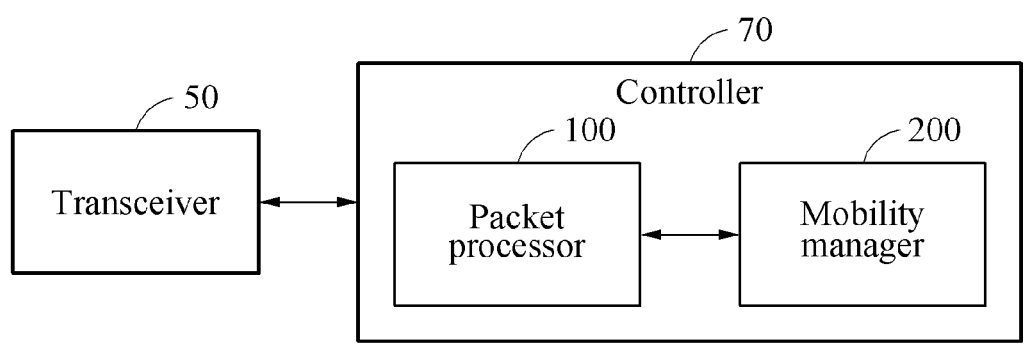
FIG. 1 is a block diagram illustrating an example of a communication apparatus according to an example embodiment.

Hereinafter, some example embodiments will be described in detail with reference to the accompanying drawings. However, various alterations and modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

Unless otherwise defined, all terms including technical and scientific terms used herein have the same meaning as commonly understood by one of ordinary skill in the art to which example embodiment belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiment with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Herein, the expression "providing a mobility or a mobility management" may indicate continuously managing a location of a terminal in a mobile communication network and transferring a communication service function, such as a voice call, a data transmission and reception, etc., to the terminal.

Herein, the expression "providing a privacy" may indicate providing a communication service of maintaining a security to prevent an eavesdropper from eavesdropping information of a terminal, such as a service used by the terminal or a location of the terminal, when the terminal performs communication within a communication network.

Herein, the term "edge router" may indicate a router that is included in a first autonomous system (AS) and connected to a second AS, which is an AS different from the first AS, and a router connected to the terminal within the first AS.

In an identifier-locator separation method, an identifier and a locator included in a header of a packet are exposed. An eavesdropper of the packet may track an identifier of the terminal and may be aware of a service that is used by the terminal since the terminal has a fixed identifier. Also, the eavesdropper may perform a terminal mobility tracking capable of verifying a movement pattern of the terminal in response to a change in a locator with respect to the identifier of the terminal.

In an Internet communication method according to the related art, it is difficult to continuously track the identifier of the terminal since an IP address of the terminal varies based on a location of the terminal. Since the identifier of the terminal is fixed and it is possible to perform a terminal mobility tracking based on the identifier of the terminal, the identifier-locator separation method is vulnerable to a terminal security compared to an existing IP address system.

To prevent the above issue, recent research has developed a method of assigning an anonymized identifier encrypted with a key of an AS to an Internet service provider or a terminal that performs communication within the AS. However, in the case of using the anonymized identifier, although an eavesdropper verifies the identifier of the terminal by eavesdropping a packet of the terminal, it is difficult to perform an identifier tracking since the identifier is encrypted. Also, although the eavesdropper acquires a locator of the terminal by eavesdropping the packet of the terminal, the eavesdropper is incapable of knowing an identifier of the terminal corresponding to the locator and thus, may not readily perform a terminal mobility tracking. As described above, a privacy of the terminal may be provided by using the anonymized identifier instead of using the identifier of the terminal.

However, in the case of simultaneously providing a mobility providing method and a privacy providing method of a terminal without considering interoperability therebetween, the privacy of the terminal may not be provided. Alternatively, an erroneous location may be transmitted and the mobility may not be provided. For example, it is assumed that a destination identifier of a packet is set using an anonymized identifier of a terminal included in an AS and transmitted. If a locator search function for providing a mobility is executed prior to interpreting the anonymized identifier, the packet is transmitted to an erroneous locator since the identifier is encrypted. Alternatively, if the mobility is provided by decrypting the anonymized identifier, the identifier of the terminal may be exposed at a destination locator. Accordingly, in the case of simultaneously applying the mobility providing method and the privacy providing method of the terminal to a network, the interoperability between the above two methods needs to be considered.

Example embodiments may provide simultaneously two techniques without causing an interoperability issue in simultaneously providing mobility management of a terminal and a privacy protection by processing one of a locator included in a packet and location information of the terminal based on a mobility of the terminal.

The interoperability issue may include a case in which the packet is normally transmitted to the terminal or the identifier of the terminal is exposed in a header of the packet.

Figure 2:
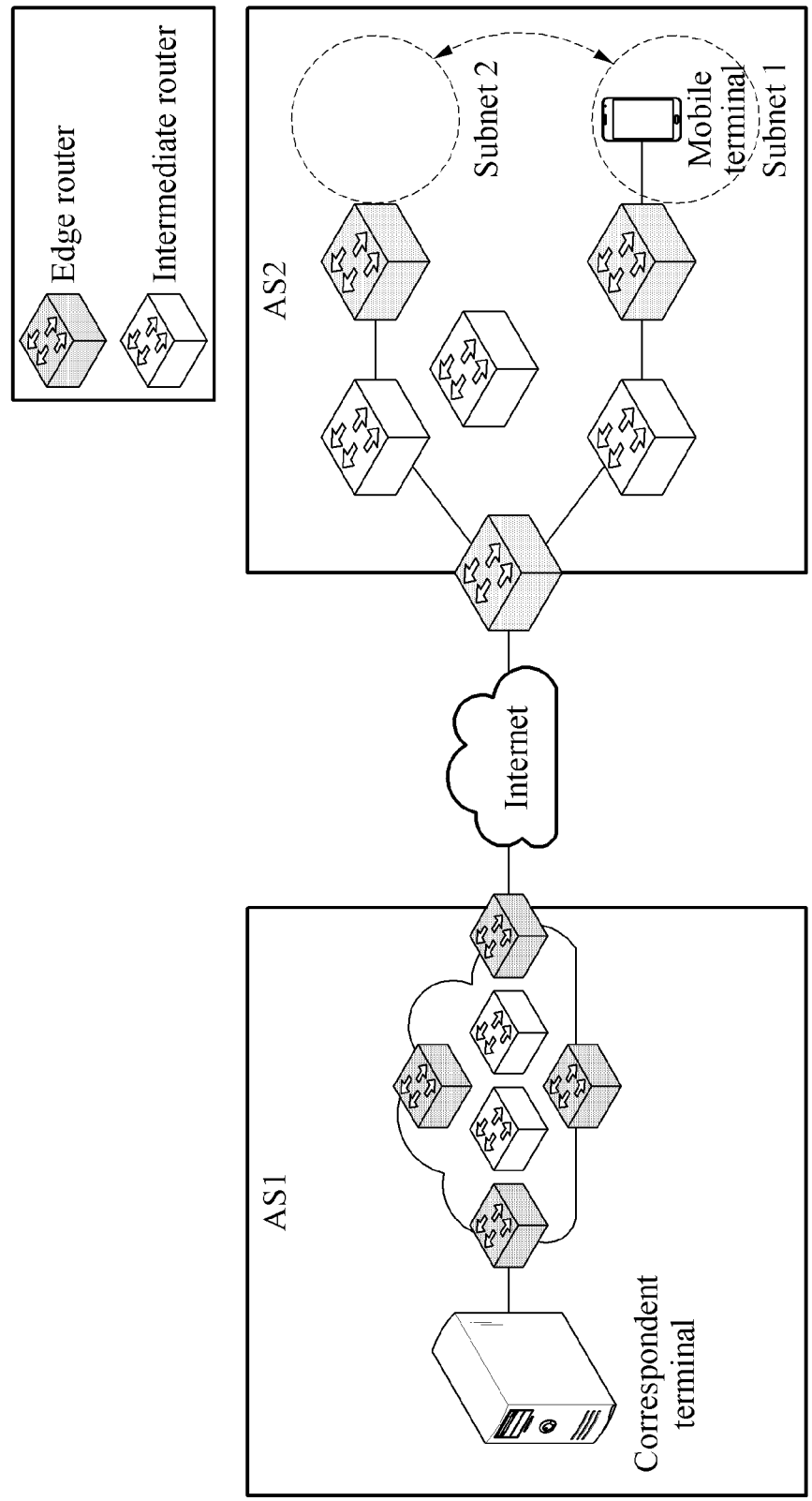
FIG. 2 illustrates an example of a network environment using the communication apparatus of FIG. 1.

FIG. 1 is a block diagram illustrating an example of a communication apparatus according to an example embodiment, and FIG. 2 illustrates an example of a network environment using the communication apparatus of FIG. 1.

Referring to FIGS. 1 and 2, a communication apparatus 10 may be installed in a network router and/or an edge router and may simultaneously provide a mobility management and a privacy protection to a terminal connected to a router. The router may include, for example, an access router (AR), an access point (AP), a base station (BS), and an area border router (ABR).

Referring to FIG. 2, the communication apparatus 10 may be installed in an edge router of a network. The communication apparatus 10 may provide a mobility to a terminal that moves between different subnets. Here, an autonomous system 1 (AS1) refers to an AS that includes a correspondent terminal and an AS2 refers to an AS that includes a mobile terminal to which the communication apparatus 10 provides the mobility management and the privacy protection. For example, the edge router may be a router connected to a mobile terminal or a router that a packet transmitted from the correspondent terminal included in the AS 1 to the mobile terminal included in the AS2 initially meets in the AS 2.

The communication apparatus 10 includes a transceiver 50 and a controller 70. The transceiver 50 may receive a packet and may transmit the packet processed through the controller 70. The controller 70 may control an overall operation of the communication apparatus 10.

The transceiver 50 may receive the packet for the terminal and may transmit the received packet to the controller 70. The controller 70 may process at least one of a locator included in the packet and location information of the terminal based on a mobility of the terminal. For example, the controller 70 may determine the mobility of the terminal based on a type of the packet. The type of the packet may be classified into a packet associated with a movement of the terminal and a packet transmitted between terminals, for example, a packet unassociated with the movement of the terminal.

The packet associated with the movement of the terminal may be a dynamic host configuration protocol (DHCP) discover/request packet that is transmitted when the terminal accesses a new network. Also, the packet associated with the movement of the terminal may include a control packet transmitted from the terminal for communication, such as an address resolution protocol (ARP) request packet, to find a media access control (MAC) address corresponding to a location at which the packet needs to arrive.

The packet transmitted between terminals may be an Internet protocol (IP) packet with being unassociated with the movement of the terminal, and also be a packet that includes a source anonymized identifier and a destination anonymized identifier in an IP option field.

Location information of the terminal varies in response to the terminal moving within the communication network. Through the mobility management of the terminal, location information of the terminal may be continuously managed and a communication service function may be continuously provided to the terminal. For the mobility management, a packet transmitted and received between the terminal and the communication apparatus 10 includes router information of a router connected to the terminal and information of the changed router when the router connected to the terminal is changed. The packet that includes information capable of continuously managing location information of the terminal may refer to a packet associated with the movement of the terminal.

The controller 70 may process a locator included in the packet when the packet is unassociated with the movement of the terminal, and may process the location information of the terminal when the packet is associated with the movement of the terminal, based on whether the packet is associated with the movement of the terminal.

The controller 70 includes a packet processor 100 and a mobility manager 200.

The packet processor 100 may determine the type of the packet indicating whether the packet is the packet associated with the movement of the terminal or the packet transmitted between terminals.

When the received packet is the packet unassociated with the movement of the terminal, the packet processor 100 may process the locator included in the packet. When the received packet is the packet associated with the movement of the terminal, the packet processor 100 may transmit the packet to the mobility manager 200.

The mobility manager 200 may receive the packet transmitted from the packet processor 100, may detect connection to the terminal, and accordingly, may acquire location information of the terminal and may register the location information of the terminal.

Also, the mobility manager 200 may acquire information of the router connected to the terminal through an identifier of the terminal based on the registered location information of the terminal. The mobility manager 200 may continuously manage current location information of the terminal such that the communication service function may be continuously provided to the terminal through the mobility management of the terminal.

Figure 3:
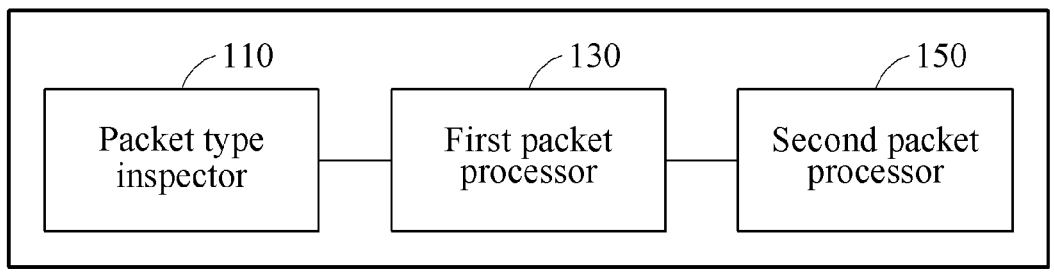
FIG. 3 is a block diagram illustrating an example of a packet processor of FIG. 1.

FIG. 3 is a block diagram illustrating an example of a packet processor of FIG. 1.

Referring to FIG. 3, the packet processor 100 may include a packet type inspector 110, a first packet processor 130, and a second packet processor 150.

The packet type inspector 110 may determine a type of a packet. Here, determining a type of a packet may indicate that the packet type inspector 110 determines whether the packet is associated with a movement of a terminal or a packet transmitted between terminals.

When the packet is associated with the movement of the terminal, the packet type inspector 110 may transmit the packet to the mobility manager 200.

When the packet is unassociated with the movement of the terminal, that is, when the packet is the packet transmitted between terminals, the packet type inspector 110 may transmit the packet to the first packet processor 130 or the second packet processor 150, depending on whether the packet is transmitted from a router of an AS that includes the communication apparatus 10.

When the packet is not transmitted from the router of the AS that includes the communication apparatus 10, the packet type inspector 110 may transmit the packet to the first packet processor 130.

When the packet is transmitted from the router of the AS that includes the communication apparatus 10, the packet type inspector 110 may transmit the packet to the second packet processor 150.

The first packet processor 130 may receive the packet from the packet type inspector 110, may process a locator included in the packet using at least one of a hidden locator having a value identified by the communication apparatus 10 and a locator of a router connected to the terminal. For example, the locator included in the packet may include a source locator and/or a destination locator.

The first packet processor 130 may determine whether the source locator of the packet is a locator included in the AS that includes the communication apparatus 10 and may determine whether to process the source locator of the packet using the hidden locator.

The first packet processor 130 may determine whether the destination locator of the packet is a locator of the AS that includes the communication apparatus 10 and may determine whether to process the destination locator of the packet using the locator of the router connected to the terminal.

The second packet processor 150 may receive the packet from the packet type inspector 110 and may process the locator included in the packet using at least one of the locator of the AS that includes the communication apparatus 10 and an identifier of the terminal. For example, the locator included in the packet may include the source locator and/or the destination locator.

The second packet processor 150 may determine whether the source locator of the packet is the locator included in the AS that includes the communication apparatus 10, and may determine whether to process the source locator of the packet using the locator of the AS that includes the communication apparatus 10.

The second packet processor 150 may determine whether the destination locator of the packet is the locator of the AS that includes the communication apparatus 10 and may determine whether to process the destination locator of the packet using the identifier of the terminal.

The first packet processor 130 or the second packet processor 150 may determine whether the locator is the locator included in the AS that includes the communication apparatus 10 based on a preset IP address range of the AS. For example, the IP address range of the AS may be represented as a subnet mask and an IP address, such as 143.248.0.0/16, and if the destination locator is 143.248.1.56, it may be determined to be included in the AS.

Figure 4:
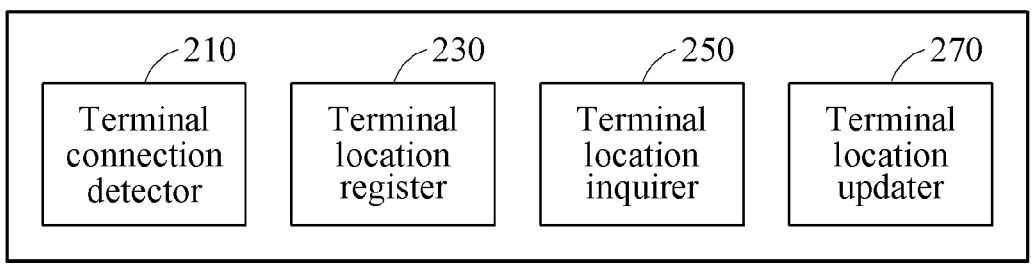
FIG. 4 is a block diagram illustrating an example of a mobility manager of FIG. 1.

FIG. 4 is a block diagram illustrating an example of a mobility manager of FIG. 1.

Referring to FIG. 4, the mobility manager 200 may include a terminal connection detector 210, a terminal location register 230, a terminal location inquirer 250, and a terminal location updater 270.

The terminal connection detector 210 may detect that a terminal is connected to a specific router and accordingly, may acquire a location of the terminal. The terminal connection detector 210 may detect a movement of the terminal by inspecting a DHCP packet or an ARP packet transmitted from the terminal to detect the connection of the terminal. The terminal connection detector 210 may detect the movement of the terminal through a signal message explicitly notifying the movement of the terminal.

The terminal location register 230 may register location information of the terminal that is detected through the terminal connection detector 210. The terminal location register 230 may store location information of the terminal in a database present in a centralized server or a distributed hash table for load distribution and expandability.

The terminal location inquirer 250 may acquire location information of the terminal registered to the terminal location register 230 based on the identifier of the terminal, and may acquire information of the router connected to the terminal.

When the router connected to the terminal is changed, the terminal location updater 270 may transmit a location of the changed terminal and a terminal location update request to the terminal location register 230 to update the location of the terminal registered to the terminal location register 230.

The terminal location updater 270 may also transmit the location of the changed terminal and the terminal location update request to other communication apparatuses.

Although the connected router is changed, the terminal may continuously receive a packet toward the terminal through the terminal connection detector 210, the terminal location register 230, and the terminal location updater 270 of the mobility manager 200.

Figure 5:
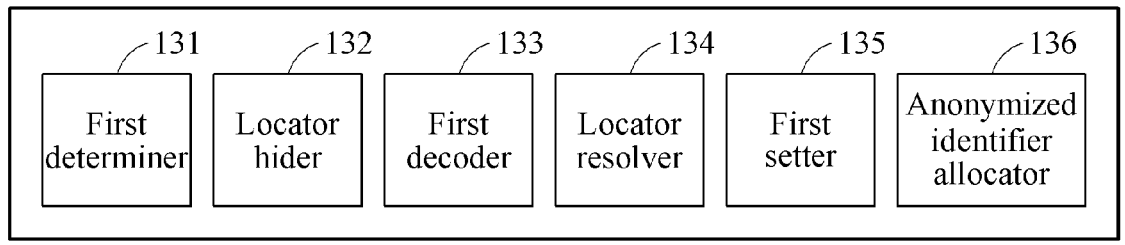
FIG. 5 is a block diagram illustrating an example of a first packet processor of FIG. 3.

FIG. 5 is a block diagram illustrating an example of a first packet processor of FIG. 3.

Referring to FIG. 5, the first packet processor 130 may include a first determiner 131, a locator hider 132, a first decoder 133, a locator resolver 134, a first setter 135, and an anonymized identifier allocator 136.

The first determiner 131 may determine whether a source locator of a packet is a locator included in an AS that includes the communication apparatus 10. When the source locator of the packet is the locator included in the AS that includes the communication apparatus 10, the first determiner 131 may transmit a hidden locator generation request signal to the locator hider 132 and may transmit the packet to the first setter 135.

The first determiner 131 may determine whether a destination locator of the packet is a locator of the AS that includes the communication apparatus 10. Here, the packet to be determined by the first determiner 131 may be the packet of which the source locator is determined by the first determiner to not be the locator included in the AS that includes the communication apparatus 10, or may be the packet of which setting of the source locator is completed by the first setter 135. When the destination locator of the packet is the locator of the AS that includes the communication apparatus 10, the first determiner 131 may transmit the packet to the first decoder 133 and/or the first setter 135. When the destination locator of the packet is not the locator of the AS that includes the communication apparatus 10, the first determiner 131 may transmit the packet.

The locator hider 132 may generate a hidden locator for hiding a location of the terminal during a communication process of the packet. Here, the locator hider 132 may receive the hidden locator generation request signal transmitted from the first determiner 131 and may generate the hidden locator. The locator hider 132 may generate the hidden locator as a value identifiable by the communication apparatus 10.

The locator hider 132 may generate the hidden locator using the preset IP address range of the AS. The communication apparatus 10 may determine whether to perform locator processing by identifying the hidden locator. For example, when the hidden locator has the same IP address value as 240.0.0.0 that is future use reversed among IP addresses, the communication apparatus 10 may identify the hidden locator.

The locator hider 132 may transmit the hidden locator to the first setter 135.

The first decoder 133 may acquire an identifier of the terminal by decrypting an anonymized identifier. An encryption key used for decryption may be the same key shared between the communication apparatuses 10 included in the same AS.

The first decoder 133 may transmit the identifier of the terminal to the locator resolver 134.

The locator resolver 134 may acquire a locator of a router connected to the terminal using the identifier of the terminal. For example, the locator resolver 134 may acquire the locator of the router connected to the terminal using the terminal location inquirer 250.

The locator resolver 134 may transmit the locator of the router to the first setter 135.

When an identifier and/or a locator are received, the first setter 135 may set the identifier and/or the locator as an identifier and/or a locator of the packet. For example, the first setter 135 may set the source locator of the packet as the hidden locator. The first setter 135 may transmit the packet of which the source locator is set as the hidden locator to the first determiner 131. The first setter 135 may set the destination locator of the packet as the locator of the router. The first setter 135 may transmit the packet of which the destination locator is set as the locator of the router.

The anonymized identifier allocator 136 may generate an anonymized identifier of the terminal by encrypting the identifier of the terminal using an encryption key. In response to a request for the anonymized identifier from the terminal, the anonymized identifier allocator 136 may provide the anonymized identifier of the terminal to the terminal. The anonymized identifier allocator 136 may set the anonymized identifier as the identifier and/or the locator of the packet. The encryption key may be the same key shared between the communication apparatuses 10 included in the same AS. An encryption scheme may use a symmetric key encryption scheme, such as an AES and a DES.

The anonymized identifier allocator 136 may run in the communication apparatus 10 and may also run in a separate server.

Figure 6:
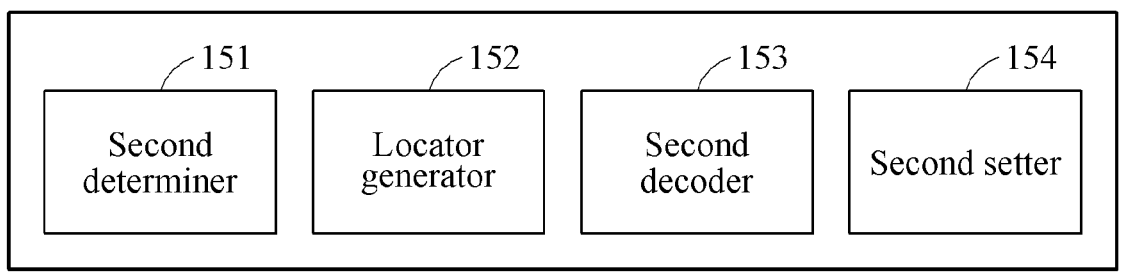
FIG. 6 is a block diagram illustrating an example of a second packet processor of FIG. 3.

FIG. 6 is a block diagram illustrating an example of a second packet processor of FIG. 3.

Referring to FIG. 6, the second packet processor 150 may include a second determiner 151, a locator generator 152, a second decoder 153, and a second setter 154.

The second determiner 151 may determine whether a source locator of a packet is a locator included in the AS that includes the communication apparatus 10 or a hidden locator. When the source locator of the packet is the locator included in the AS that includes the communication apparatus 10 or the hidden locator, the second determiner 151 may transmit an AS locator generation request signal to the locator generator 152 and may transmit the packet to the second setter 154.

The second determiner 151 may determine whether a destination locator of the packet is the locator included in the AS that includes the communication apparatus 10. Here, the packet to be determined by the second determiner 151 may be the packet of which the source locator is determined by the second determiner 151 to not be the locator included in the AS that includes the communication apparatus 10 or the hidden locator, or may be the packet of which setting of the source locator is completed by the second setter 154. When the destination locator of the packet is the locator included in the AS that includes the communication apparatus 10, the second determiner 151 may transmit the packet to the second decoder 153 and/or the second setter 154. When the destination locator of the packet is not the locator included in the AS that includes the communication apparatus 10, the second determiner 151 may transmit the packet.

The locator generator 152 may generate a locator of the AS that includes the communication apparatus 10. Here, the locator generator 152 may receive the AS locator generation request signal transmitted from the second determiner 151 and may generate the locator of the AS. The locator generator 152 may transmit the locator of the AS to the second setter 154.

The second decoder 153 may acquire an identifier of the terminal by decrypting the anonymized identifier. An encryption key used for decryption may be the same key shared between the communication apparatuses 10 included in the same AS. The second decoder 153 may transmit the identifier of the terminal to the second setter 154.

When an identifier and/or a locator are received, the second setter 154 may set as the identifier and/or the locator as an identifier and/or a locator of the packet. For example, the second setter 154 may set the source locator of the packet as the locator of the AS. The second setter 154 may transmit the packet of which the source locator is set as the locator of the AS to the second determiner 151. The second setter 154 may set the destination locator of the packet as the identifier of the terminal. The second setter 154 may transmit the packet of which the destination locator is set as the identifier of the terminal.

Figure 7:
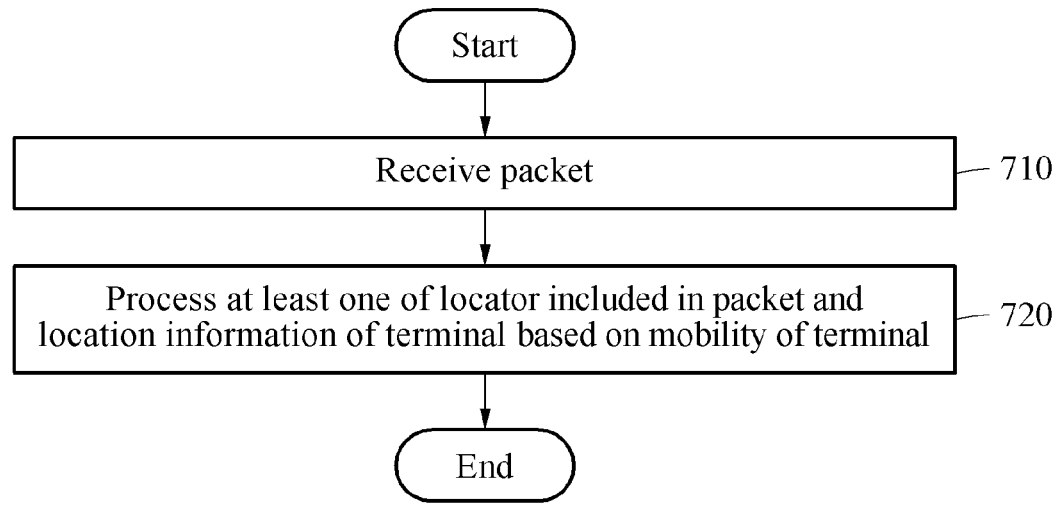
FIG. 7 is a flowchart illustrating an example of a communication method according to an example embodiment.

FIG. 7 is a flowchart illustrating an example of a communication method according to an example embodiment.

Referring to FIG. 7, in operation 710, the communication apparatus 10 receives a packet for a terminal.

In operation 720, the communication apparatus 10 processes at least one of a locator included in the packet and location information of the terminal based on a mobility of the terminal.

Figure 8:
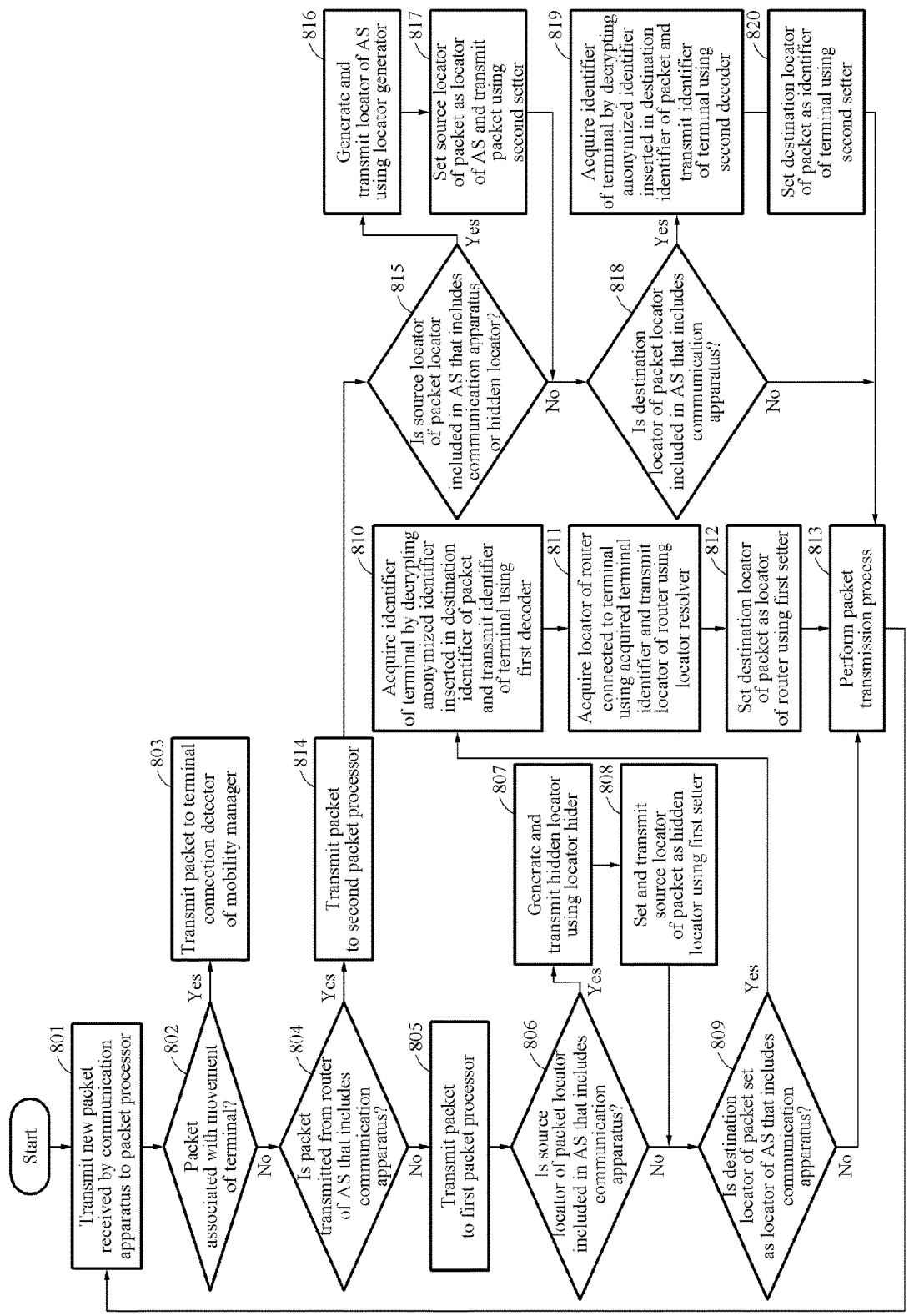
FIG. 8 is a flowchart illustrating an example of a packet processing method of a communication apparatus according to an example embodiment.

FIG. 8 is a flowchart illustrating an example of a packet processing method of a communication apparatus according to an example embodiment.

Referring to FIG. 8, in operation 801, the communication apparatus 10 may receive a new packet and may transmit the received new packet to the packet processor 100. The packet processor 100 may transmit the packet to the packet type inspector 110.

In operation 802, the packet type inspector 110 may determine a type of the packet, that is, may determine whether the packet is a packet associated with a movement of the terminal or a packet transmitted between terminals. When the packet is associated with the movement of the terminal, the packet type inspector 110 may transmit the packet to the terminal connection detector 210 of the mobility manager 200 in operation 803. When the packet is unassociated with the movement of the terminal, that is, when the packet is the packet transmitted between different terminals, the packet type inspector 110 may determine whether the packet is transmitted from a router of an AS that includes the communication apparatus 10 in operation 804.

When the packet is not transmitted from the router of the AS that includes the communication apparatus 10, the packet type inspector 110 may transmit the packet to the first packet processor 130 in operation 805.

When the packet is transmitted from the router of the AS that includes the communication apparatus 10, the packet type inspector 110 may transmit the packet to the second packet processor 150 in operation 814.

When the first packet processor 130 receives the packet, the first determiner 131 may determine whether a source locator of the packet is a locator included in the AS that includes the communication apparatus 10 in operation 806.

When the source locator is the locator included in the AS that includes the communication apparatus 10, the first determiner 131 may transmit a hidden locator generation request signal to the locator hider 132 and may transmit the packet to the first setter 135.

In operation 807, the locator hider 132 may generate a hidden locator and may transmit the hidden locator to the first setter 135.

In operation 808, the first setter 135 may set the source locator of the packet as the hidden locator and may transmit the packet to the first determiner 131.

When the source locator is not the locator included in the AS that includes the communication apparatus 10, the first determiner 131 may determine whether a destination locator of the packet is a locator of the AS that includes the communication apparatus 10 in operation 809. Here, the packet to be determined by the first determiner 131 may be the packet of which the source locator is determined by the first determiner 131 to not be the locator included in the AS that includes the communication apparatus 10, or may be the packet of which setting of the source locator is completed by the first setter 135.

When the destination locator is the locator of the AS that includes the communication apparatus 10, the first determiner 131 may transmit the packet to the first decoder 133 and/or the first setter 135.

In operation 810, the first decoder 133 may acquire an identifier of the terminal by decrypting an anonymized identifier included in the destination identifier of the packet and may transmit the identifier of the terminal to the locator resolver 134.

In operation 811, the locator resolver 134 may acquire a locator of a router connected to the terminal using the identifier of the terminal, and may transmit the locator of the router to the first setter 135.

In operation 812, the first setter 135 may set the destination locator of the packet as the locator of the router.

When the destination locator is not the locator of the AS that includes the communication apparatus 10 or when setting of the destination locator of the packet is completed by the first setter 135, the communication apparatus 10 may perform a packet transmission process in operation 813.

When the second packet processor 150 receives the packet, the second determiner 151 may determine whether the source locator of the packet is the locator included in the AS that includes the communication apparatus 10 or the hidden locator in operation 815.

When the source locator is the locator included in the AS that includes the communication apparatus 10 or the hidden locator, the second determiner 151 may transmit an AS locator generation request signal to the locator generator 152 and may transmit the packet to the second setter 154.

In operation 816, the locator generator 152 may generate the locator of the AS that includes the communication apparatus 10 and may transmit the locator of the AS to the second setter 154.

In operation 817, the second setter 154 may set the source locator of the packet as the locator of the AS and may transmit the packet to the second determiner 151.

When the source locator is not the locator included in the AS that includes the communication apparatus 10 or the hidden locator, the second determiner 151 may determine whether the destination locator of the packet is the locator included in the AS that includes the communication apparatus 10 in operation 818. Here, the packet to be determined by the second determiner 151 may be the packet of which the source locator is determined by the second determiner 151 to not be the locator included in the AS that includes the communication apparatus 10 or the hidden locator, or may be the packet of which setting of the source locator is completed by the second setter 154.

When the destination locator is the locator included in the AS that includes the communication apparatus 10, the second determiner 151 may transmit the packet to the second decoder 153 and/or the second setter 154.

In operation 819, the second decoder 153 may acquire the identifier of the terminal by decrypting the anonymized identifier included in the destination identifier of the packet and may transmit the identifier of the terminal to the second setter 154.

In operation 820, the second setter 154 may set the source locator of the packet as the identifier of the terminal.

When the destination locator is not the locator included in the AS that includes the communication apparatus 10 or when setting of the destination locator of the packet is completed by the second setter 154, the communication apparatus 10 may perform the packet transmission process in operation 813.

The packet transmission of the communication apparatus 10 may be performed through a software or hardware router or switch.

Figure 9:
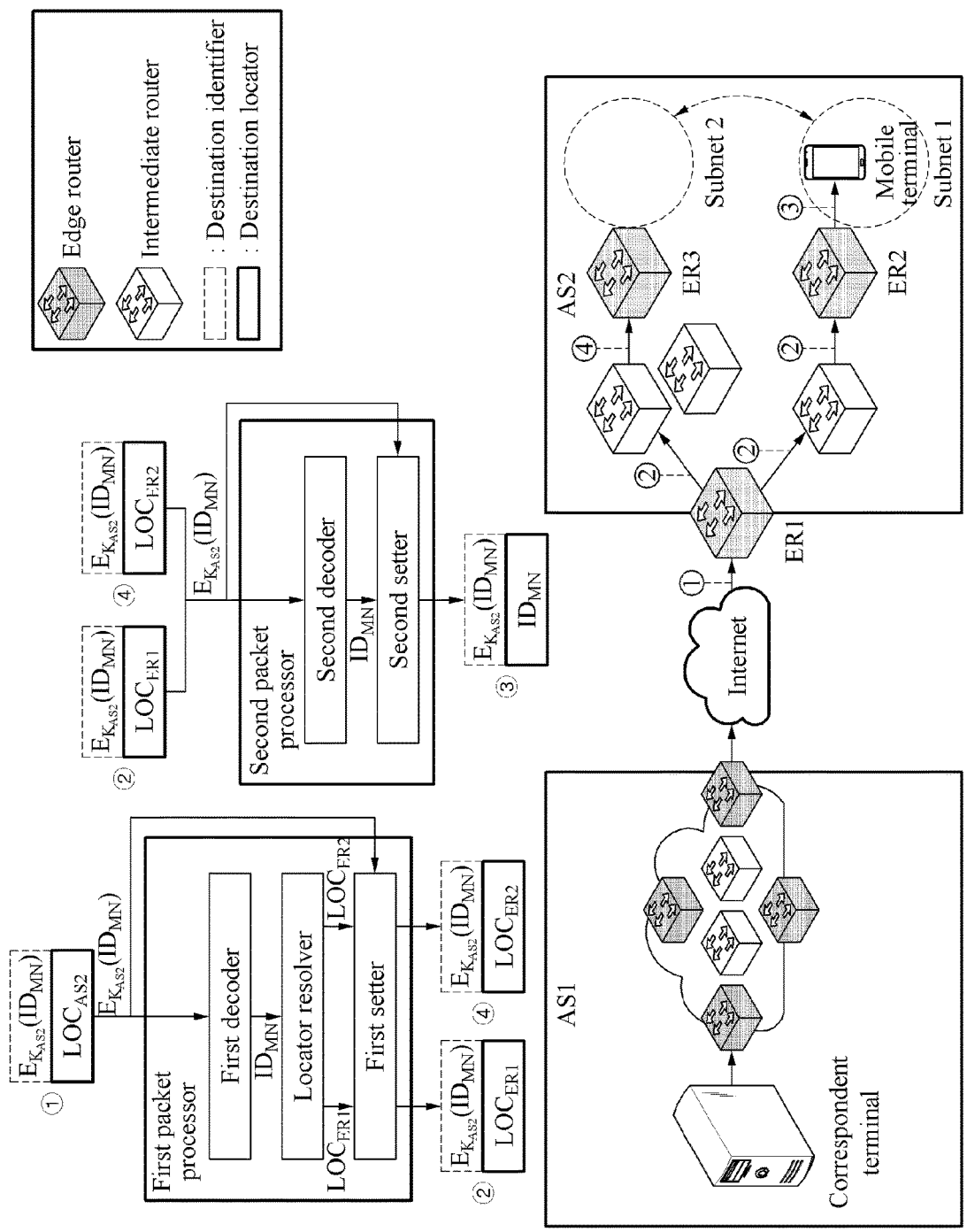
FIG. 9 illustrates an example of transmitting a packet from a correspondent terminal to a mobile terminal according to an example embodiment.

FIG. 9 illustrates an example of transmitting a packet from a correspondent terminal to a mobile terminal according to an example embodiment.

Referring to FIG. 9, a correspondent terminal may set a destination locator of a packet that is transmitted to a mobile terminal as an AS2 that includes the mobile terminal. A locator of the AS2 that includes the mobile terminal may be represented as $LOC_{AS2}$. A destination identifier of the packet, that is, an identifier of the mobile terminal may be encrypted with $K_{AS2}$ that is a key value of the AS2. An encrypted anonymized identifier of the mobile terminal may be represented as $E_{KAS2}(ID_{MN})$. The packet may be transmitted by setting the destination identifier of the packet as the anonymized identifier of the mobile terminal (packet header ①).

An upper end of each of packet headers ①, ②, ③ and ④ may refer to the destination identifier of the packet and a lower end thereof may refer to a destination locator of the packet. A source identifier and a source locator of each of the packet headers ①, ②, ③ and ④ may be set as $E_{KAS1}(ID_{CN})$ that is an identifier of the correspondent terminal and $LOC_{AS1}$ that is a locator of an AS1 that includes the correspondent terminal.

When the packet (packet header ①) arrives at an edge router 1 (ER1) that is a first router outside the AS2, a first packet processor may acquire $ID_{MN}$ that is the identifier of the mobile terminal from the anonymized identifier $E_{KAS2}(ID_{MN})$ using a first decoder.

A locator resolver may locate a location of the mobile terminal of which the identifier is $ID_{MN}$, and may acquire a locator of a router connected to the mobile terminal. When the router connected to the mobile terminal is an edge router 2 (ER2), a location of the mobile terminal may be represented as $LOC_{ER2}$. When the mobile terminal is connected at an edge router 3 (ER3), the location of the mobile terminal may be represented as $LOC_{ER3}$.

The first setter may set the destination locator of the packet as $LOC_{ER2}$ or $LOC_{ER3}$ that is a locator of the router connected to the mobile terminal, acquired by the locator resolver. Through this process, the destination identifier $ID_{MN}$ of the packet is not exposed in the packet header during transmission of the packet. Therefore, it is difficult for an inside eavesdropper of the AS2 to be aware of a terminal to which the packet is transmitted.

A communication apparatus may transmit the packet of which the destination locator is set by the first setter to an internal router of the AS2 (packet header ②). For example, the communication apparatus may transmit the packet to an edge router connected to the mobile terminal through an Internet routing protocol, such as an open shortest path first protocol (OSPF) or routing information protocol (RIP) using the destination locator of the packet.

The edge router at which the packet arrives may include a processing process of a second packet processor configured to retrieve an actual identifier, $ID_{MN}$, of the mobile terminal from the anonymized identifier $E_{KAS2}(ID_{MN})$ of the mobile terminal. A second decoder acquires the identifier of the mobile terminal by decrypting the anonymized destination identifier of the packet. A second setter sets, as the destination locator of the packet, the identifier of the mobile terminal that is acquired by the second decoder through decryption. The communication apparatus transmits the packet of which the destination locator is set by the second setter to the mobile terminal (packet header ③), and the mobile terminal may receive the packet.

Figure 10:
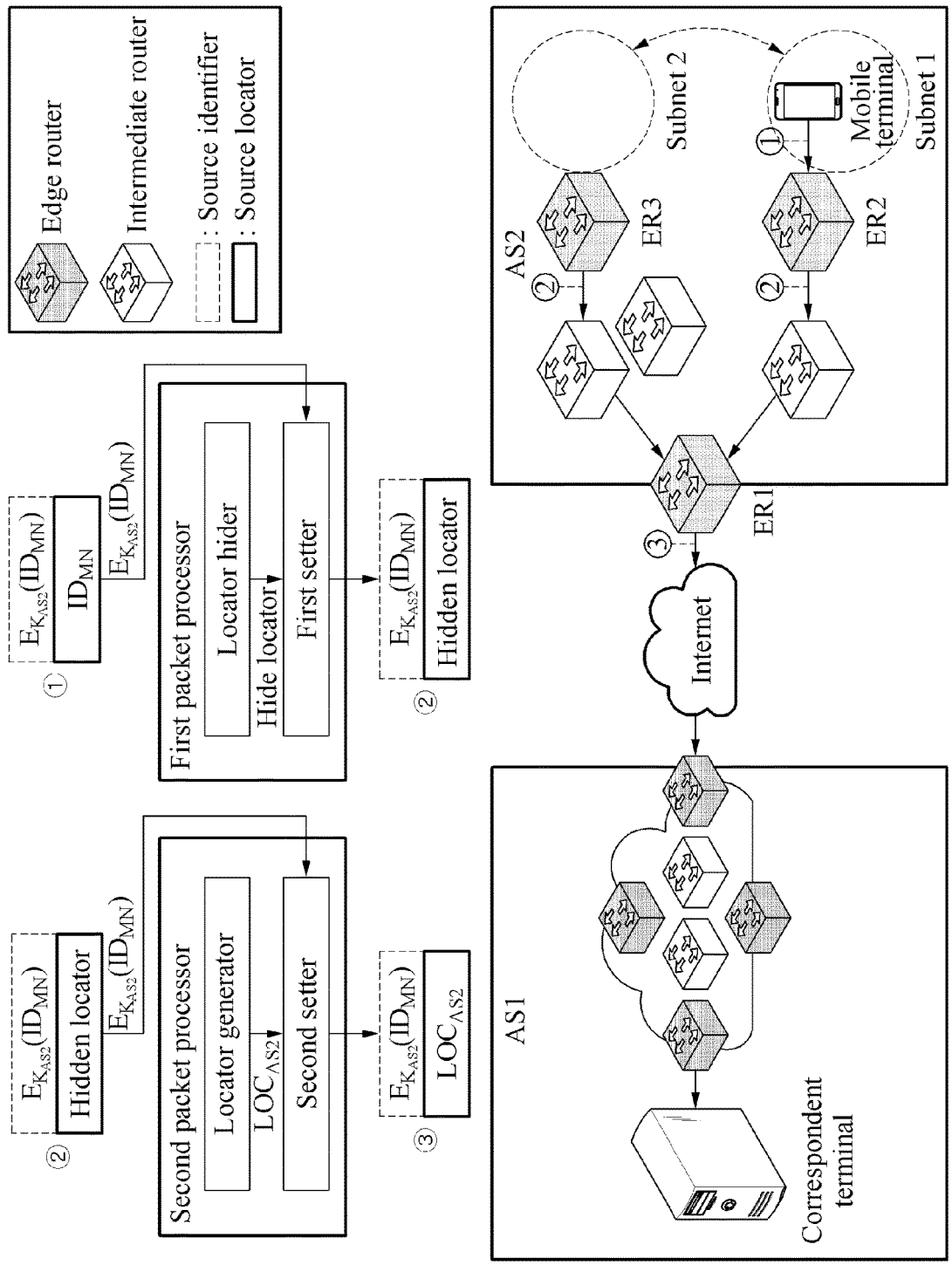
FIG. 10 illustrates an example of transmitting a packet from a mobile terminal to a correspondent terminal according to an example embodiment.

FIG. 10 illustrates an example of transmitting a packet from a mobile terminal to a correspondent terminal according to an example embodiment.

Referring to FIG. 10, a mobile terminal may set a source locator of a packet transmitted to a correspondent terminal as an AS2 that includes the mobile terminal, which may be represented as $LOC_{AS2}$. A source identifier of the packet may be set as $E_{KAS2}(ID_{MN})$ that is an anonymized identifier of the mobile terminal, encrypted with $K_{AS2}$ that is a key value of the AS2 and the packet may be transmitted (packet header ①).

An upper end of each of packet headers ①, ②, and ③ may refer to the source identifier of the packet and a lower end thereof may refer to the source locator of the packet. A destination identifier and a destination locator may be set to $E_{KAS1}(ID_{CN})$ and the $LOC_{AS1}$, which are the same value.

Such that the mobile terminal may transmit the packet to the correspondent terminal, the mobile terminal may need to be aware of $E_{KAS1}(ID_{CN})$ and $LOC_{AS1}$. To this end, it may be assumed that a service for providing the encrypted identifier $E_{KAS1}(ID_{CN})$ of the correspondent terminal and the AS locator $LOC_{AS1}$ of the correspondent terminal is provided as an Internet service.

Once the mobile terminal acquires an identifier and a locator of the correspondent terminal, the mobile terminal may insert the identifier and the locator into the destination identifier and the destination locator of the packet and may transmit the same to an access router, for example, ER2 or ER3 of FIG. 10, connected to the mobile terminal. Here, the anonymized identifier $E_{KAS2}(ID_{MN})$ allocated by an anonymized identifier allocator of a second packet processor may be inserted into the source identifier, and the identifier $ID_{MN}$ of the mobile terminal may be inserted into the source locator (packet header ①).

A first packet processor may run at the ER2 or ER3 that is the router to which the packet is initially transmitted from the mobile terminal. The first packet processor generates a hidden locator to be newly inserted by executing a locator hider to hide an identifier of the mobile terminal in the source locator of the packet and then may insert the hidden locator into a source locator of the packet header using a first setter. The changed packet (packet header ②) may be transmitted to an ER1 through an Internet routing protocol.

When the ER1 receives the packet, the ER1 may execute the second packet processor. The second packet processor may execute a locator generator configured to generate a locator of an AS such that the correspondent terminal may be aware of the AS locator $LOC_{AS1}$ of the mobile terminal. For example, the locator generator may use the locator of the ER1 as the AS locator. A second setter may set the AS locator as the source locator of the packet. In the case of transmitting the set packet (packet header ③) to an outside of the AS2 that includes the mobile terminal, the packet may be transmitted to the AS1 that includes the correspondent terminal according to an Internet routing protocol.

Figure 11:
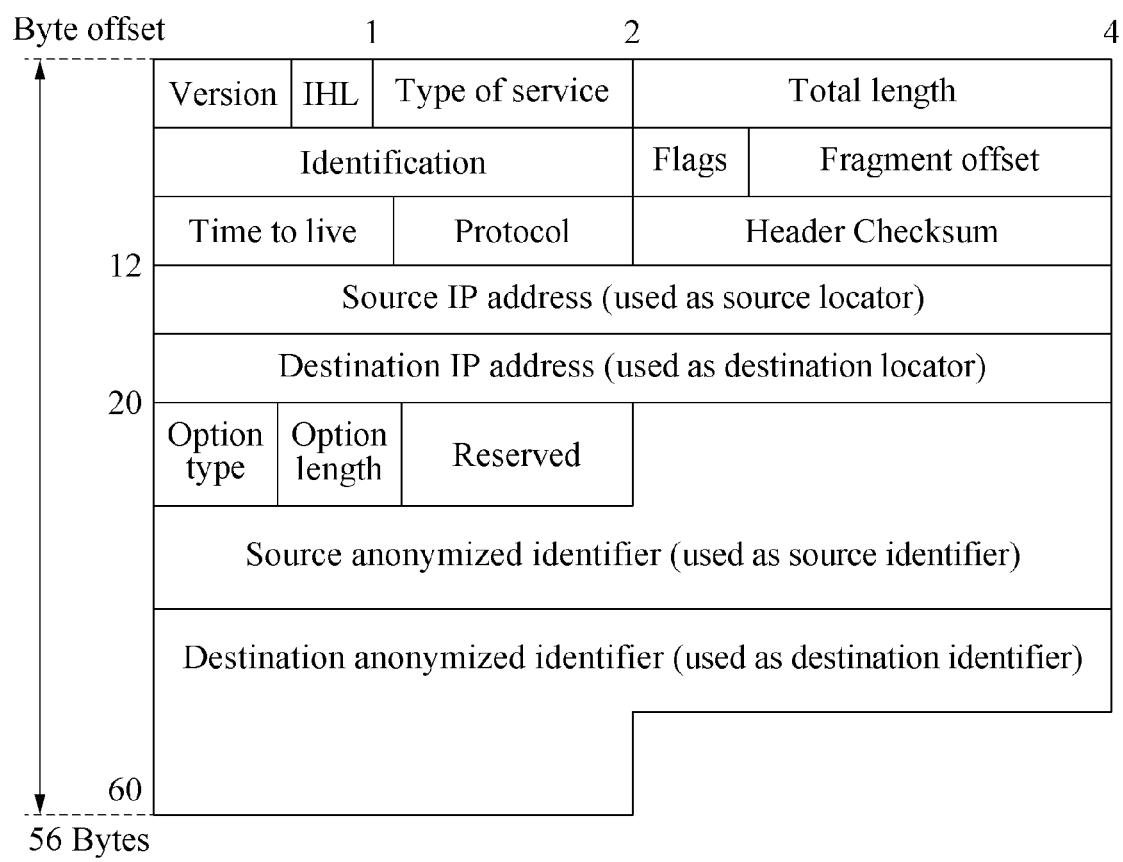
FIG. 11 illustrates an example of a packet used by a communication apparatus according to an example embodiment.

FIG. 11 illustrates an example of a packet used by a communication apparatus according to an example embodiment.

Referring to FIG. 11, a packet header used by the communication apparatus may include an identifier and a locator. A source locator and a destination locator may use a source IP address and a destination IP address of an IPv4 packet, respectively. A source identifier and a destination identifier may use an IP option field. Each of the source identifier and the destination identifier of the IP option field may use 16 bytes. An entire IP header length including a header, the source identifier, and the destination identifier of the IP option field may be a total of 56 bytes.

The source identifier and the destination identifier use the IP option field and thus, may be compatible with an existing Internet routing protocol. Also, an intermediate router, not an edge router, may be available without correction.

To transmit the packet having the packet header ① of FIG. 10, the mobile terminal may insert an anonymized identifier of the mobile terminal into the source identifier and may insert an anonymized identifier of the correspondent terminal into the destination identifier.

Figure 12:
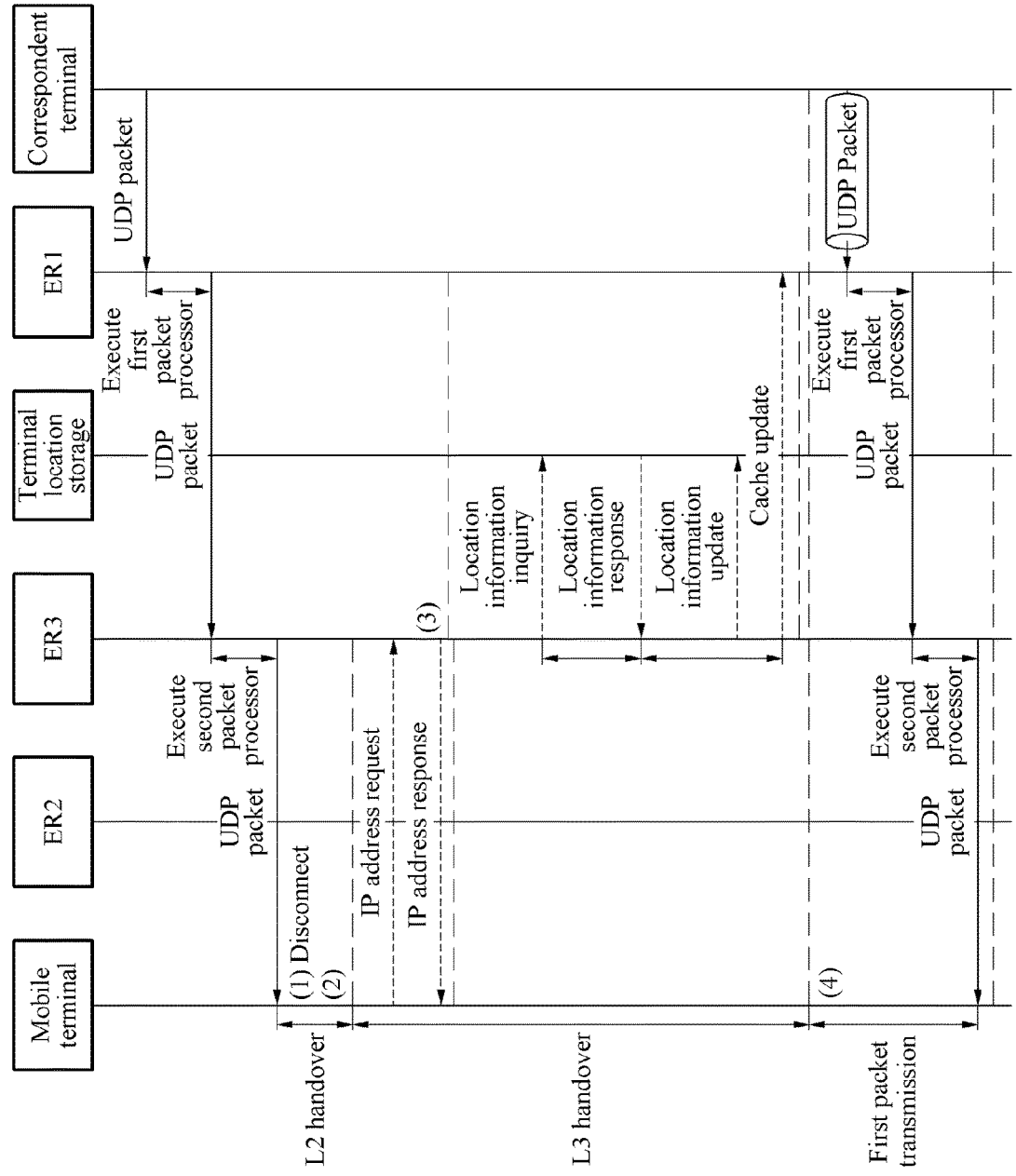
FIG. 12 illustrates an example of an operation of a communication apparatus according to an example embodiment.

FIG. 12 illustrates an example of an operation of a communication apparatus according to an example embodiment.

Referring to FIG. 12, the communication apparatus may seamlessly receive a packet regardless of a change in an edge router connected to a mobile terminal during communication between the mobile terminal and a correspondent terminal.

Although the edge router connected to the mobile terminal is changed, the mobile terminal may seamlessly receive the packet during communication with the correspondent terminal.

In response to a movement of the mobile terminal from an ER2 to an ER3, layer 2 (L2) handover may be performed (operation (1)). A packet towards the mobile terminal is directed to the ER2. Therefore, although L2 connection with the ER3 is completed, the mobile terminal may not readily receive the packet.

Once the L2 connection with the ER3 is completed, the mobile terminal performs an address request (operation (2)). In response to the address request, the communication apparatus present in the ER3 may allocate the same IP address as that of the mobile terminal used before the movement using a mobility manager.

The communication apparatus may perform an IP address allocation and may inquire to a terminal location storage about location information of the mobile terminal (operation (3)). The terminal location storage may include information about a location of the mobile terminal and a list of edge routers that cache location information.

The terminal location storage may transmit the information to a packet processor of the ER 3 as a response. In response thereto, the packet processor may request the terminal location storage to update a new location of the mobile terminal. Additionally, the packet processor may request edge routers that cache the location information to perform a cache update. For example, an ER1 including cache information about the location of the mobile terminal may receive a cache update request.

Once the ER1 performs the cache update, a packet processor of the ER1 may transmit the packet for the mobile terminal to the ER3 using a first packet processor (operation (4)). The packet arriving at the ER3 may be transmitted to the terminal using a second packet processor.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method comprising:
receiving a packet for a terminal;
processing at least one of a locator included in the packet and location information of the terminal based on a mobility of the terminal; and
transmitting the packet to the terminal based on processing result at least one of the locator and the location information,
wherein the processing comprises processing the locator included in the packet when the packet is unassociated with the movement of the terminal, and
wherein the processing of the locator comprises:
determining whether the packet is transmitted from a router of an autonomous system (AS) that includes a communication apparatus;
processing the locator using at least one of a hidden locator and a locator of a router connected to the terminal, when the packet is determined to not be transmitted from the router of the AS that includes the communication apparatus; and
processing the locator using at least one of a locator of the AS that includes the communication apparatus and an identifier of the terminal, when the packet is transmitted to be transmitted from the router of the AS that includes the communication apparatus.

2. The communication method of claim 1, wherein the processing comprises:
detecting a connection of the terminal.

3. The communication method of claim 2, wherein the detecting comprises detecting the connection of the terminal by inspecting a dynamic host configuration protocol (DHCP) packet or an address resolution protocol (ARP) packet transmitted from the terminal.

4. The communication method of claim 1, wherein the processing of the locator using at least one of the hidden locator and the locator of the router connected to the terminal comprises:
determining whether a source locator of the packet is a locator included in the AS and determining whether to process the source locator of the packet using the hidden locator; and
determining whether a destination locator of the packet is the locator of the AS and determining whether to process the destination locator of the packet using the locator of the router connected to the terminal.

5. The communication method of claim 4, wherein the determining whether to process the source locator of the packet comprises:
generating the hidden locator when the source locator of the packet is the locator included in the AS; and
setting the generated hidden locator as the source locator of the packet.

6. The communication method of claim 5, further comprising:
generating an anonymized identifier of the terminal by encrypting the identifier of the terminal; and
transmitting the generated anonymized identifier to the terminal or setting the generated anonymized identifier as a source identifier of the packet.

7. The communication method of claim 6, wherein the encrypting uses an advanced encryption standard (AES) or a data encryption standard (DES).

8. The communication method of claim 4, wherein the determining whether to process the destination locator of the packet comprises:
acquiring an identifier of the terminal by decrypting an anonymized identifier included in a destination identifier of the packet when the destination locator of the packet is the locator of the AS;
acquiring the locator of the router connected to the terminal using the acquired identifier of the terminal; and
setting the acquired locator of the router as the destination locator of the packet.

9. The communication method of claim 1, wherein the processing the locator using at least one of the identifier of the terminal and the locator of the AS that includes the communication apparatus comprises:
determining whether a source locator of the packet is a locator included in the AS or the hidden locator and determining whether to process the source locator of the packet using the locator of the AS; and
determining whether a destination locator of the packet is the locator included in the AS and determining whether to process the destination locator of the packet using the locator of the router connected to the terminal.

10. The communication method of claim 9, wherein the determining whether to process the source locator of the packet comprises:
generating the locator of the AS when the source locator of the packet is the locator included in the AS or the hidden locator; and
setting the generated locator of the AS as the source locator of the packet.

11. The communication method of claim 9, wherein the determining whether to process the destination locator of the packet comprises:
acquiring an identifier of the terminal by descripting an anonymized identifier included in a destination identifier of the packet when the destination locator of the packet is the locator included in the AS; and
setting the acquired identifier of the terminal as the destination locator of the packet.

12. A communication apparatus comprising:
a transceiver configured to receive a packet for a terminal; and
a controller configured to process at least one of a locator included in the packet and location information of the terminal based on a mobility of the terminal, and transmit the packet to the terminal based on processing result at least one of the locator and the location information,
wherein the controller comprises:
a packet processor configured to process the locator included in the packet when the packet is unassociated with the movement of the terminal, and
wherein the packet processor comprises:
a packet type inspector configured to determine the type of the packet, to transmit the packet to the mobility manager when the packet is associated with the movement of the terminal and to transmit the packet to a first packet processor or a second packet processor depending on whether the packet is transmitted from a router of an autonomous system (AS) that includes the communication apparatus, when the packet is unassociated with the movement of the terminal;
the first packet processor configured to process the locator included in the packet using at least one of a hidden locator and a locator of a router connected to the terminal; and
the second packet processor configured to process the locator included in the packet using at least one of a locator of the AS that includes the communication apparatus and an identifier of the terminal.

13. The communication apparatus of claim 12, wherein the mobility manager comprises:
a terminal connection detector configured to detect a connection of the terminal using the packet.

14. The communication apparatus of claim 13, wherein the mobility manager comprises:
a terminal location inquirer configured to acquire router information connected to the terminal using an identifier of the terminal, based on the location of the terminal registered to the terminal location register.

15. The communication apparatus of claim 13, wherein the terminal connection detector is configured to detect the connection of the terminal by inspecting a dynamic host configuration protocol (DHCP) packet or an address resolution protocol (ARP) packet transmitted from the terminal.

16. The communication apparatus of claim 12, wherein the first packet processor comprises:
a first determiner configured to determine at least one of whether a source locator of the packet is a locator included in the AS and whether a destination locator of the packet is a locator of the AS, and to transmit at least one of a hidden locator generation signal and the packet depending on the determining;
a locator hider configured to receive the hidden locator generation signal and to generate the hidden locator;
a first decoder configured to acquire an identifier of the terminal by decrypting an anonymized identifier included in a destination identifier of the packet;
a locator resolver configured to acquire the locator of the router connected to the terminal using the identifier of the terminal; and
a first setter configured to set one of the hidden locator and the locator of the router as the source locator of the packet.

17. The communication apparatus of claim 16, wherein the first packet processor further comprises:
an anonymized identifier allocator configured to generate the anonymized identifier of the terminal by encrypting the identifier of the terminal and to transmit the generated anonymized identifier to the terminal or to set the generated anonymized identifier as the source locator of the packet.

18. The communication apparatus of claim 17, wherein the encryption uses an advanced encryption standard (AES) or a data encryption standard (DES).

19. The communication apparatus of claim 12, wherein the second packet processor comprises:
a second determiner configured to determine at least one of whether a source locator of the packet is the locator included in the AS or a hidden locator and whether a destination locator of the packet is the locator included in the AS and to transmit at least one of an AS locator generation signal and the packet depending on the determining;
a locator generator configured to receive the AS locator generation signal and to generate the locator of the AS;
a second decoder configured to acquire an identifier of the terminal by decrypting an anonymized identifier included in a destination identifier of the packet; and
a second setter configured to set the locator of the AS or the identifier of the terminal as the destination locator of the packet.

* * * * *